Patented Sept. 12, 1939

2,172,463

UNITED STATES PATENT OFFICE 2,172,463

LATEX COMPOSITIONS

Everett V. Anderson, Naugatuck, Conn., assignor, by mesne assignments, to United States Rubber Company, New York, N. Y., a corporation of New Jersey No Drawing. Application February 13, 1937, Serial No. 125,643

19 Claims. (Cl. 260—793)

This invention relates to new latex compositions, their preparation and use, to the products derived therefrom, and more particularly to new classes of latex accelerators.

There has been a general want for ultra-accelerators which can be used alone or in activated combination with other organic accelerators in vulcanizable latex compositions, without causing the latex rubber to prevulcanize, especially where the compounded latex is stored for long periods of time before use.

The general run of dithiocarbamate accelerators are recognized either as ultra or semi-ultra accelerators for ordinary solid rubber such as milled rubber, e. g. pale crepe and smoked sheet. In contradistinction to such crude rubbers normal latex usually contains ammonia preservative and is a colloidal system of comparatively complicated and chemical behavior. As pointed out in U. S. P. 1,995,859, the technique of using latex involves distinct problems compared to that of solid coagulated milled rubbers.

Accelerators for latex should not interfere with the stability of the latex at room temperatures, and they may or may not be soluble in the aqueous portion of the latex, but should be soluble to some extent in the rubber thereof, because when the rubber is deposited and the water removed by drying or draining away as in coating fabrics, the rubber residue remaining must be sufficient to properly vulcanize.

In some cases where ammonia is present in the latex, it stimulates or activates the accelerator, and the latex composition tends to prevulcanize at ordinary temperatures unless the ammonia is first removed from the latex by evaporation or neutralization. In other cases, in order to inhibit or prevent prevulcanization from proceeding in the latex state, the latex must be kept substantially below the critical temperature of the organic accelerator by means of suitable refrigeration, or one of the ingredients essential to vulcanization must be omitted, as in the vulcanization of thin-walled articles, whereby the goods formed from a latex compound containing no accelerator are cured in a hot aqueous solution of the accelerator.

In view of the difficulties hereinabove set forth, it has now been found that certain salts of N-substituted dithiocarbamic acids are superior anti-scorch latex accelerators for latices containing a vulcanizing agent if the latex in addition contains ammonia or substituted ammonia compound. The ammonia compound broadly is one in which not more than one of the ammonia hydrogens has been replaced by an organic hydrocarbon radical preferably an alkyl radical and is further characterized as being per se of a volatile nature whereby to allow its removal as desired by heating of the latex composition. This applies to alkali-metal salts of N-aralkyl-substituted dithiocarbamic acids of the general formula $$\begin{array}{c}\text{Aralkyl}\\ \phantom{Aralkyl}\diagdown\\ \phantom{Aralkyl}\phantom{aaa}N-\underset{\underset{S}{\|}}{C}-S-M\\ \phantom{Aralkyl}\diagup\\ \text{Aralkyl}\end{array}$$

where M represents an alkali-metal radical which may in the case of ammonium be substituted. The term alkali-metal herein is therefore to be construed broadly as meaning the well-known alkali metals such as sodium, potassium, etc., as well as the hypothetical alkali-metal radical ammonium which may be unsubstituted or substituted by monovalent hydrocarbon radicals.

The presence of the aralkyl group enhances the later solubility of the compound in rubber and therefore the preferred compounds are those in which at least two of the replaceable hydrogens of the ammonium group are each replaced by an aralkyl radical exemplified by dibenzyl-ammonium N-dibenzyl dithiocarbamate which has the formula $$\begin{array}{c}C_6H_5.CH_2\\ \phantom{C_6H_5.CH_2}\diagdown\phantom{aaaaa}H\phantom{a}H\\ \phantom{C_6H_5.CH_2}\phantom{aa}N-\underset{\underset{S}{\|}}{C}-S-\underset{}{N}\diagup\phantom{a}\diagdown\\ \phantom{C_6H_5.CH_2}\diagup\phantom{aaaaaaa}CH_2.C_6H_5\\ C_6H_5.CH_2\phantom{aaaaaaaaaaa}CH_2.C_6H_5\end{array}$$

Other aralkyls may be used besides benzyl which is the most commonly known and preferred one.

The presence of ammonia or substituted ammonia is necessary to obtaining anti-scorching results. If the ammonia or substituted ammonia is removed, vulcanization tends to take place, and the compounded latex prevulcanizes in a short time and cannot therefore be stored for any prolonged period. In the presence of ammonia or methylamine, the compounded latex, for example, one containing the sulphur, zinc oxide, and the above accelerator may be stored up to six months at room temperature without showing appreciable prevulcanization. It is believed that the presence of the ammonia or alkylamine tends to form an ammonium salt in situ with the accelerator which ammonium salt is less soluble in the rubber and hence acts to retard precuring of the rubber. On this basis the invention could be applied to the use of any salt of an N-diaralkyl dithiocarbamic acid which is convertible in situ by action with the ammonia or alkyl amine in the latex to an ammonium salt thereof. The tendency to precure increases with decreasing amounts of ammonia or substituted ammonia present. If the amount of the ammonia is too low it can be raised by adding more ammonia to the latex. If it is too high it may be reduced by neutralization with formaldehyde. Preferably, the latex should contain at least about 0.5% by weight of ammonia or substituted ammonia.

The amount of the accelerator may be varied, larger amounts being used where it is used alone and smaller amounts are useable where it is used in conjunction with another organic accelerator. Generally, the accelerator may vary from 0.5% to about 3% based on 100 parts of rubber of the latex on a dry basis.

The thiazole type of accelerators form with the dithiocarbamates a strongly activated accelerator combination. Notwithstanding this, by the present invention, the combination can be safely used in the latex containing ammonia without causing severe prevulcanization. For example, a vulcanizable compounded latex containing 2.0% sulphur, 0.6% ammonia, 1.4% of dibenzyl ammonium N-dibenzyldithiocarbamate and 0.6% zinc salt of mercaptobenzothiazole, after 13 days storage at 50° C., shows to have about 1.32% of free (uncombined) sulphur, whereas a similar sample containing 0.09% ammonia completely precures in seven days. Furthermore the tensiles of the accelerator combination show that the combination is more active in a film dried in air at 110° C. than where the benzyl substituted dithiocarbamate is used in a similar example as the sole accelerator in an amount equal to the weight of the aforesaid accelerator combination.

The deactivating influence of the ammonia or substituted ammonia persists only so long as it is present and when reduced or removed by neutralization or by drying the latex, vulcanization may proceed normally. This property of ammonia on the present dithiocarbamate accelerators may be used to advantage in various ways. For example, if it is desired to heat the fully compounded solid latex rubber without vulcanizing it, the heating may be done in boiling water or steam containing ammonia. Upon neutralization or driving off of the ammonia, vulcanization may proceed when desired, by heating in the usual way.

The invention also provides a convenient means of controlling the vulcanization of the rubber in the latex state. For example, the ammonia or substituted ammonia content may be reduced by aeration or neutralization with formaldehyde to about 0.1% by weight, thereby allowing vulcanization to proceed at room temperature or higher. By reintroducing ammonia or substituted ammonia into the latex prior to substantially complete vulcanization of the rubber globule, the vulcanization of the latex can be checked at any desired stage by thus deactivating the accelerator.

The accelerators herein are free to exert their normal function when the influence of the ammonia or substituted ammonia is removed. The deactivating influence of the ammonia should not be confused with those cases where ammonia tends to slowly decompose the accelerator. In the latter case the rubber deposited from such compounds will not vulcanize properly.

The following example illustrates the accelerating activity of a preferred anti-scorching latex accelerator:

Example 1.—Ammonia preserved latex is compounded with 2.0 parts of colloidal sulphur, 2.5 parts of colloidal oxide, and 1.0 part of dibenzyl-ammonium N-dibenzyl dithiocarbamate, based on 100 parts by weight of rubber (dry basis). Test films of this latex compound are prepared by dipping on a test plate and drying (heat coagulation), and also by acid coagulation (10% acetic acid+90% alcohol). The test films so obtained are dried and vulcanized in an air oven at 100° C. with the following results:

Films—Dip and dry

| Time of cure in minutes | 10 | 20 | 30 | 60 | 90 |
|---|---|---|---|---|---|
| Ultimate tensile in lbs./sq. in | 2560 | 5108 | 4310 | 4800 | 4000 |

Films—Acid coagulated

| Time of cure in minutes | 10 | 20 | 30 | 60 | 90 |
|---|---|---|---|---|---|
| Ultimate tensile in lbs./sq. in | 1815 | 2326 | 4578 | 5200 | 4060 |

The latex composition of this invention may be prepared from natural or artificially prepared aqueous dispersions of rubber or rubber-like gums, including natural latex, previously coagulated crude and/or reclaimed rubbers, or mixtures of the same, and the term latex is therefore to be construed broadly. Also, the latex to be compounded may contain any desired concentration of water or be a purified latex such as results from creaming or centrifuging. It may further contain other suitable fillers and compounding ingredients than those given above.

Having thus described my invention, what I claim and desire to protect by Letters Patent is:

1. Compounded latex containing a vulcanizing agent and having the property of remaining relatively stable and substantially unvulcanized on storage for a prolonged period of time, characterized in containing in addition to at least about 0.5% by weight of a compound of the general formula

where R is a radical selected from the group consisting of hydrogen and alkyl, an alkali metal salt of an N-aralkyl-substituted dithiocarbamic acid.

2. Compounded latex containing a vulcanizing agent and having the property of remaining relatively stable and substantially unvulcanized on storage for a prolonged period of time, characterized in containing in addition to at least about 0.5% by weight of a compound of the general formula

where R is a radical selected from the group consisting of hydrogen and alkyl, an N-aralkyl substituted dithiocarbamic acid of the general formula

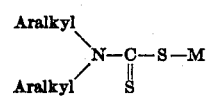

where M represents an alkali-metal radical which may in the case of ammonium be substituted.

3. Compounded latex containing a vulcanizing agent and having the property of remaining relatively stable and substantially unvulcanized on storage for a prolonged period of time, characterized in containing in addition to ammonia, an N-aralkyl substituted dithiocarbamic acid of the general formula

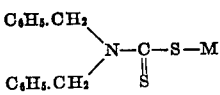

where M represents an alkali-metal radical which may in the case of ammonium be substituted.

4. Compounded latex containing a vulcanizing agent and having the property of remaining relatively stable and substantially unvulcanized on storage for a prolonged period of time, characterized in containing in addition to at least about 0.5% by weight of an ammonia compound in which not more than one of the ammonia hydrogens has been replaced by an alkyl radical, an ammonium salt of an N-diaralkyl-substituted dithiocarbamic acid.

5. Compounded latex containing a vulcanizing agent and having the property of remaining relatively stable and substantially unvulcanized on storage for a prolonged period of time, characterized in containing in addition to ammonia, a diaralkyl-ammonium salt of an N-di-aralkyl-substituted dithiocarbamic acid.

6. Compounded latex containing a vulcanizing agent and having the property of remaining relatively stable and substantially unvulcanized on storage for a prolonged period of time, characterized in containing in addition to ammonia, an ammonium salt of an U-dibenzyl substituted dithiocarbamic acid.

7. Compounded latex containing a vulcanizing agent and having the property of remaining relatively stable and substantially unvulcanized on storage for a prolonged period of time, characterized in containing in addition-to ammonia, a benzyl ammonium salt of an N-aralkyl dithiocarbamic acid in which at least two of the hydrogens of the ammonium group are substituted by a benzyl radical.

8. Compounded latex containing a vulcanizing agent and having the property of remaining relatively stable and substantially unvulcanized on storage for a prolonged period of time, characterized in containing in addition to ammonia, dibenzyl-ammonium N-dibenzyl-dithiocarbamate.

9. Compounded latex containing a vulcanizing agent and having the property of remaining relatively stable and substantially unvulcanized on storage for a prolonged period of time, characterized in containing in addition to ammonia, sodium salt of an N-diaralkyl-substituted dithiocarbamic acid.

10. Compounded latex containing a vulcanizing agent and having the property of remaining relatively stable and substantially unvulcanized on storage for a prolonged period of time, characterized in containing in addition to ammonia, sodium salt of an N-dibenzyl dithiocarbamic acid.

11. Compounded latex containing a vulcanizing agent and having the property of remaining relatively stable and substantially unvulcanized on storage for a prolonged period of time, characterized in containing in addition to ammonia, potassium salt of an N-diaralkyl-substituted dithiocarbamic acid.

12. Compounded latex containing a vulcanizing agent and having the property of remaining relatively stable and substantially unvulcanized on storage for a prolonged period of time, characterized in containing in addition to ammonia, potassium salt of an N-dibenzyl dithiocarbamic acid.

13. A process of controlling the vulcanization of the rubber of a vulcanizable latex composition which comprises incorporating in a vulcanizable latex composition an alkali-metal salt of an N-aralkyl-substituted dithiocarbamic acid capable of having its accelerating function arrested by ammonia, deactivating the dithiocarbamic acid accelerator with ammonia while the accelerator is associated with the rubber and a vulcanizing agent, thereby rendering the rubber substantially free from prevulcanizing and thereafter removing the influence of the ammonia so as to allow the associated accelerator to exercise its normal accelerating activity.

14. A process which comprises partially vulcanizing a vulcanizable latex composition in the presence of an alkali metal salt of an N-aralkyl-substituted dithiocarbamic acid, adding to the latex an ammonia compound of the general formula

where R is a radical selected from the group consisting of hydrogen and alkyl, said ammonia compound being in an amount sufficient to deactivate said salt whereby to restrain further vulcanization of the latex composition.

15. A partially vulcanized latex composition containing an alkali metal salt of an N-aralkyl substituted dithiocarbamic acid whose accelerating activity is restrained by the presence of an ammonia compound of the general formula

where R is a radical selected from the group consisting of hydrogen and alkyl, said ammonia compound being in an amount sufficient to deactivate said salt, and the rubber of which composition is capable of being further vulcanized when the deactivating influence of said ammonia compound is removed.

16. A process of treating latex containing a vulcanizing agent and an alkali metal salt of an N-di-aralkyl substituted dithiocarbamic acid and an ammonia compound of the general formula

where R is a radical selected from the group consisting of hydrogen and alkyl which comprises reducing the content of said ammonia compound to about 0.1%, vulcanizing the latex to a desired state of cure, and then adding an additional amount of the ammonia compound to the latex composition to check further vulcanization.

17. A process of treating latex containing a vulcanizing agent and an alkali metal salt of an N-di-aralkyl substituted dithiocarbamic acid and an ammonia compound of the general formula

where R is a radical selected from the group consisting of hydrogen and alkyl which comprises reducing the content of said ammonia compound to about 0.1%, vulcanizing the latex to a desired state of cure, then adding an additional amount of the ammonia compound to the latex composition to check further vulcanization, and subsequently depositing the rubber by coagulation in desired form.

18. A rubber article resulting from the process set forth in claim 17.

19. A process of compounding latex containing a vulcanizing agent whereby to control its vulcanization which comprises adding and converting a salt of an N-di-aralkyl dithiocarbamic acid to an ammonium salt in the latex in the presence of an ammonia compound capable of forming said ammonium salt and which ammonium salt is less active as an accelerator in the latex than said first mentioned salt.

EVERETT V. ANDERSON.